UNITED STATES PATENT OFFICE.

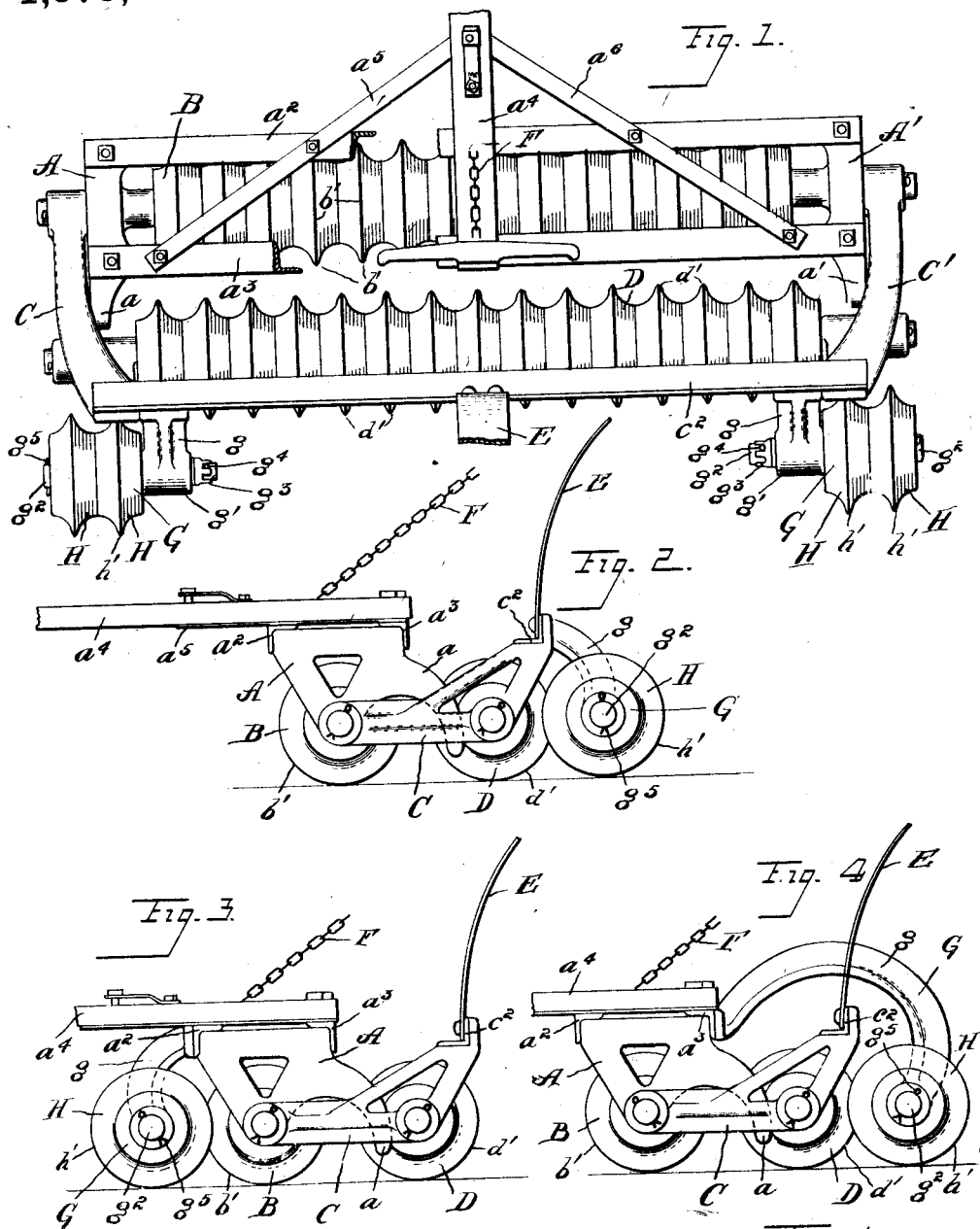

WILEY J. DUNHAM, OF BEREA, OHIO, ASSIGNOR TO THE DUNHAM COMPANY, OF BEREA, OHIO.

IMPLEMENT ATTACHMENT.

1,075,633. Specification of Letters Patent. Patented Oct. 14, 1913.

Application filed September 3, 1912. Serial No. 718,207.

*To all whom it may concern:*

Be it known that I, WILEY J. DUNHAM, a citizen of the United States, residing at Berea, in the county of Cuyahoga and State of Ohio, have invented a new and useful Improvement in Implement Attachments, of which the following is a specification, the principle of the invention being herein explained and the best mode in which I have contemplated applying that principle, so as to distinguish it from other inventions.

My invention while relating broadly to implement attachments is more particularly associated with an auxiliary and complemental pulverizing device.

The object of the invention is to widen the cut of the machine in question to or beyond the extent of the superstructure, in order that the soil may be cultivated by pulverization close up to fences, trees and other field fixtures.

The said invention consists of means which are hereinafter described and particularly pointed out in the claims.

The annexed drawing and the following description set forth in detail certain means embodying my invention, the disclosed means, however, constituting but some of various mechanical forms in which the principle of my invention may be applied.

With reference now to the drawing, Figure I is a plan of an implement embodying my invention, with certain parts broken away. Fig. II is a side elevation of the same. Fig. III is a like elevation of one modification. Fig. IV is a similar view of a second modification.

*Implement.*—The structure of the implement represented, and in conjunction with which my inventive attachment may by way of exemplification be depicted, consists of a pair of triangular end supports A and A' having rearwardly extending guide arms $a$ and $a'$. These forward supports are rigidly connected by front and rear angle-iron beams respectively $a^2$ and $a^3$. Mounted upon the beams is any approved type of pole $a^4$ which is as usual reinforced laterally by means of the braces $a^5$ and $a^6$. Alined and rotatably mounted between the supports A and A' are a plurality of pulverizing disks B having cutting edges $b'$. These disks constitute the forward gang in the double gang implement which has been selected for illustration.

Pivotally mounted upon the forward supports A and A', in a manner which it will not be necessary to describe since it forms no part of the conception at issue, are another pair of supports C and C'. These are adapted to be restricted as to lateral displacement during their pivotal movement by the guide arms $a$ and $a'$. The rear supports C and C' are shown held together by a single beam $c^2$ of like design. Similarly mounted for rotation between the supports C and C' are another series of disks D having cutting edges $d'$, and these constitute the rear gang. It will be seen that these rear disks are spaced laterally with definite relation to those of the forward gang, namely in such a way that each of the disks D is intermediate and preferably midway of some forward pair.

A resilient seat support is indicated and hence designated as E, while a similar fragment of the retaining chain extending toward it is supplied with the reference character F.

*Attachment.*—The preferred form of and location for the attachment proper is seen in Figs. I and II. It will be noted that one is provided at each lateral end of the implement and inasmuch as they are in a patentable sense identical both will be designated entire as G and only one hereafter described. It consists of a downwardly curved bracket $g$ which is shown fixedly secured near one end of the beam $c^2$. At its lowermost extremity this bracket $g$ is formed with a boss $g'$ having a substantially horizontal opening. The imaginary axis of this opening should rest in the same horizontal plane as the axes of the forward and rear gangs. A suitable axle $g^2$ is disposed in this opening and secured through the medium of the cap $g^3$ and cotter-pin $g^4$ so that it projects a chosen distance outwardly beyond the superstructure of the implement as a whole. One or more, in this instance two, additional pulverizing disks H are likewise rotatably mounted upon the axle $g^2$ and held in place by another cotter-pin $g^5$.

The auxiliary disks H on the attachment are positioned so that their cutting edges $h'$ are as is best seen in Fig. II, correspondingly spaced from each other as any two adjacent of the disks D. The disks H and D are furthermore of like size and the former, as disposed rearwardly, constitute a complementive operative alinement with respect to the latter or rear gang and together they occasion a continuous and uniform pulverizing operation in the direction of the moving implement.

Otherwise phrased the cutting edge of the inner of the disks H cuts or pulverizes on an operative line parallel with and equally spaced from, both the line traversed by the cutting edge of the disk H which is adjacent to it and the line traversed by the cutting edge of the proximate outer disk D. Consonantly the inner surface of the inner of the auxiliary disks H should preferably and does lie in the same plane as the outer surface of the proximate outer of the rear disks D, and consequently the attachment as an entirety may be said to be in uniformly continuing operative alinement with respect to a given gang.

The modified form shown in Fig. III discloses the attachment fastened to the forward gang and specifically to the forward beam $a^2$. In this event the disks H should best conform in size, and be spaced laterally in similar wise relative, to the forward instead of the rearward gang. The parallel operative cutting lines of the disks H would, during the application of this modification, be equally spaced both from each other and from that line cut by the proximate end disk of the forward gang, whereby a continuously uniform alinement would be established and likewise a continuously uniform pulverizing operation across the entire width of the implement.

The modification represented in Fig. IV similarly limits the attachment in so far as it is not independently movable with the rear gang. Here it is again rearwardly located though attached to the rear beam $a^2$ of the forward gang. The curvature of the bracket $g$ is necessarily heightened in an upward direction in order to avoid interference with the independent upward movement of the rear gang.

Having now fully described my invention, what I claim and desire to secure by Letters Patent is:

1. An implement attachment comprising the combination with an implement: of a pulverizer gang, having a plurality of disks, pivotally mounted upon opposite ends of said implement so as to have independent vertical movement, a bracket fixedly secured to said gang and projecting laterally beyond one end thereof, and a pulverizing disk rotatably mounted upon such bracket, and laterally of both said bracket and said implement, the said disk being disposed in complementive operative alinement with respect to said gang.

2. An implement attachment comprising the combination with a pulverizer gang having a plurality of primary disks; of a member movably connected to the outer side thereof so as to have independent vertical movement, an outer side bracket secured to said member, and a secondary pulverizing disk supported upon such bracket and disposed laterally of said gang and of the plane of the corresponding outer edge of said implement, the said disk being furthermore spaced in corresponding operative alinement with respect to the proximate end disk of said gang.

3. An implement attachment comprising the combination with a pulverizer gang having a plurality of laterally alined contiguous disks; of a bracket secured at one end of said gang and projecting outwardly with respect thereto and beyond said gang, and a plurality of similar auxiliary disks mounted for movement upon said bracket and beyond said gang, such auxiliary disks being likewise contiguous and disposed in continuing operative alinement with respect to the proximate end disk of said gang.

4. An implement attachment comprising the combination with a pulverizer gang having a plurality of laterally alined primary disks; of a downwardly projecting bracket attached to said gang and provided with an opening, an axle horizontally supported in said opening and projecting laterally of said gang, and a plurality of similar and auxiliary disks rotatable upon said axle, the inner surface of the inner of said auxiliary disks being disposed in the same plane as the outer surface of the corresponding end one of said primary disks.

Signed by me this 28th day of August, 1912.

WILEY J. DUNHAM.

Attested by—
 J. R. Dunham,
 R. E. Dunham.